United States Patent
Smith et al.

(10) Patent No.: US 12,554,522 B2
(45) Date of Patent: Feb. 17, 2026

(54) SYSTEMS AND METHODS FOR EXECUTING A PROCESS USING A LIGHTWEIGHT JAVA WORKFLOW ORCHESTRATION LIBRARY AND A GRAPH DATA STRUCTURE

(71) Applicant: JPMORGAN CHASE BANK, N.A., New York, NY (US)

(72) Inventors: Lamar J. Smith, Chicago, IL (US); Van Hong Nguyen, Delaware, OH (US); Christian Mendoza, Chicago, IL (US); Michael Lipkie, Crystal Lake, IL (US); Troy W. Eddy, Northbrook, IL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 646 days.

(21) Appl. No.: 17/198,067

(22) Filed: Mar. 10, 2021

(65) Prior Publication Data
US 2022/0291939 A1    Sep. 15, 2022

(51) Int. Cl.
*G06F 9/455* (2018.01)
*G06F 16/901* (2019.01)

(52) U.S. Cl.
CPC ...... *G06F 9/45558* (2013.01); *G06F 16/9024* (2019.01); *G06F 2009/45562* (2013.01)

(58) Field of Classification Search
None
See application file for complete search history.

(56) References Cited

U.S. PATENT DOCUMENTS

| | | | |
|---|---|---|---|
| 11,567,735 B1 * | 1/2023 | Kulkarni | G06F 16/24534 |
| 11,656,852 B2 * | 5/2023 | Mazurskiy | G06F 8/36 |
| | | | 717/107 |
| 2020/0293920 A1 * | 9/2020 | Chung | G06N 5/022 |
| 2022/0092412 A1 * | 3/2022 | Srivastava | G06N 3/08 |
| 2022/0197947 A1 * | 6/2022 | Scheepens | G06F 16/9035 |

* cited by examiner

Primary Examiner — Bradley A Teets
Assistant Examiner — Melissa A Headly
(74) Attorney, Agent, or Firm — GREENBERG TRAURIG LLP (57) ABSTRACT

A method for executing a process may include: receiving a process comprising data to execute from a sub-system; identifying a process graph for the process to execute, the process graph comprising a plurality of nodes connected by edges, each of the plurality of nodes in the process graph represents a type of operation to perform, an identification of data input, and an address for a handler; retrieve the identified process graph from a process graph source; traverse the identified process graph to a first node; call a first handler identified by the first node with the data; receive a first result; select, based on the result, one of a plurality of edges from the first node to a second node; call a second handler identified by the second node with the first result and the data; receive a second result; and output the second result to the sub-system.

20 Claims, 2 Drawing Sheets

SYSTEMS AND METHODS FOR EXECUTING A PROCESS USING A LIGHTWEIGHT JAVA WORKFLOW ORCHESTRATION LIBRARY AND A GRAPH DATA STRUCTURE

BACKGROUND OF THE INVENTION

1. Field of the Invention

Embodiments relate generally to systems and methods for executing a process using a lightweight java workflow orchestration library and a graph data structure.

2. Description of the Related Art

In many domains, coordinating processing of a transaction in a system with multiple components is a major challenge. This is especially true when a given transaction flow can vary significantly by use case within a domain. Often, the underlying implemented feature set does not vary significantly for a mature system, but the number of iterations on how those features may need to be sequenced to support a given flow can vary widely. For example, processing platforms may have a common need to change processing flow implementations based on globally available clearing rules, payment schemes, client preferences, and in-country regulatory requirements. This often involves retooling existing applications to consider a given flow and to take an alternate path for executing the payment.

The need for these numerous but subtle tweaks to the orchestration of an existing feature set is a common pattern across many industries. This problem is typically solved by adding additional Boolean logic and branches to code to create some amount of reuse between existing features that only need to be executed in a different way. The long-term effects are technical assets that become difficult to maintain or further extend. This produces a high cost for companies that frequently have to invest in major refactoring or total rewrites of their systems.

SUMMARY OF THE INVENTION

Systems and methods for executing a process using a lightweight java workflow orchestration library and a graph data structure are disclosed. In one embodiment, a computer-implemented method for executing a process using a process graph data structure may include: (1) receiving, at an orchestration computer program executed by at least one computer processor, a process comprising data to execute from a sub-system; (2) identifying, by the orchestration computer program, a process graph for the process to execute, the process graph comprising a plurality of nodes connected by edges, wherein each of the plurality of nodes in the process graph represents a type of operation to perform, an identification of data input for the operation, and an address for a handler to perform the operation; (3) retrieving, by the orchestration computer program, the identified process graph from a process graph source; (4) traversing, by the orchestration computer program, the identified process graph to a first node; (5) calling, by the orchestration computer program, a first handler identified by the first node with the data; (6) receiving, by the orchestration computer program and from the first handler, a first result; (7) selecting, based on the result, one of a plurality of edges from the first node to a second node; (8) calling, by the orchestration computer program, a second handler identified by the second node with the first result and the data; (9) receiving, by the orchestration computer program and from the second handler, a second result; and (10) outputting, by the orchestration computer program, the second result to the sub-system.

In one embodiment, the sub-system may include a terminal.

In one embodiment, the address may include a webserver address for the handler.

In one embodiment, 1 the address may include a Kafka topic.

In one embodiment, the first result may include a completion event.

In one embodiment, the method may further include: receiving, by the orchestration computer program, a trigger; traversing, by the orchestration computer program, the process graph to a node comprising a trigger edge; and traversing, by the orchestration computer program, the trigger edge to a third node that executes a trigger event for the trigger. The method may even further include persisting, by the orchestration computer program, a flag in response to receiving a trigger.

According to another embodiment, a system for executing a process using a process graph data structure may include: an orchestrator computer program executed by at least one computer program; a plurality of handlers, each handler associated one of a plurality of operations; and a process graph database comprising a plurality of process graphs, wherein each process graph may include a plurality of nodes connected by edges, wherein each of the plurality of nodes in the process graph represents a type of operation to perform, an identification of data input for the operation, and an address for a handler to perform the operation. The orchestration computer program may be configured to receive a process comprising data to execute from a sub-system; identify one of the plurality of process graph for the process to execute; retrieve the identified process graph from a process graph source; traverse the identified process graph to a first node; call a first handler identified by the first node with the data; receive a first result from the first handler; select one of a plurality of edges from the first node to a second node based on the result; call a second handler identified by the second node with the first result and the data; receive a second result from the second handler; and output the second result to the sub-system.

In one embodiment, the sub-system may include a terminal.

In one embodiment, the address may include a webserver address for the handler.

In one embodiment, the address may include a Kafka topic.

In one embodiment, the first result may include a completion event.

In one embodiment, the orchestration computer program may be further configured to: receive a trigger; traverse the process graph to a node comprising a trigger edge; and traverse the trigger edge to a third node that executes a trigger event for the trigger.

In one embodiment, the orchestration computer program may be further configured to persist a flag in response to receiving a trigger.

According to another embodiment, a non-transitory computer readable medium is disclosed. The non-transitory computer readable medium may have stored thereon software instructions that, when executed by a processor, cause the processor to perform the following: receive a process comprising data to execute from a sub-system; identify a process graph for the process to execute, the process graph comprising a plurality of nodes connected by edges, wherein each of the plurality of nodes in the process graph represents a type of operation to perform, an identification of data input for the operation, and an address for a handler to perform the operation; retrieve the identified process graph from a process graph source; traverse the identified process graph to a first node; call a first handler identified by the first node with the data; receive a first result from the first handler; select one of a plurality of edges from the first node to a second node based on the result; call a second handler identified by the second node with the first result and the data; receive a second result from the second handler; and output the second result to the sub-system.

In one embodiment, the address may include a webserver address for the handler.

In one embodiment, the address may include a Kafka topic.

In one embodiment, the first result may include a completion event.

In one embodiment, the non-transitory computer readable medium may further include software instructions that, when executed by a processor, cause the processor to perform the following: receive a trigger; traverse the process graph to a node comprising a trigger edge; and traverse the trigger edge to a third node that executes a trigger event for the trigger. The non-transitory computer readable medium may further include software instructions that, when executed by a processor, cause the processor to persist a flag in response to receiving a trigger.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments relate generally to systems and methods for executing a process using a lightweight java workflow orchestration library and a graph data structure.

Embodiments may centralize coordination of micro services built for any domain (e.g., payments, securities, non-financial domains, etc.) by allowing teams to represent their distinct flows and use cases as a set of directed graph data structures. Each node in the graph may represent a type of operation to perform, the data input needed for that operation, and an address to forward the request and data to (e.g., a Rest URL, a Kafka topic, or a local JVM (Java Virtual Machine) method). The request may be forwarded to a handler via a preferred transport protocol, and the result of the handler's execution of the operation may be returned by the handler indicating success or failure so that the orchestrator can navigate the graph to the next appropriate operation. This allows teams to focus their business logic and code on providing the operations in the form of request handlers, such as micro services or collocated Java methods.

Determining how to sequence the requests together then becomes a practice of defining the graphs that connect the set of available operations to execute a specific flow. It also mitigates many layers of conditionals and edge case handling in code that is solely present to divert logic down a given path where one use case diverges from another. The creation of the workflow graphs may be performed manually, but since the graphs are data to be recalled at run time, the graphs may be created and loaded dynamically without the need to bring down a running application. In embodiments, machine learning predictive algorithms, and/or pre-defined rules may be leveraged to generate graphs to execute on the fly based on the input and the needs of the end user.

Figure 1:
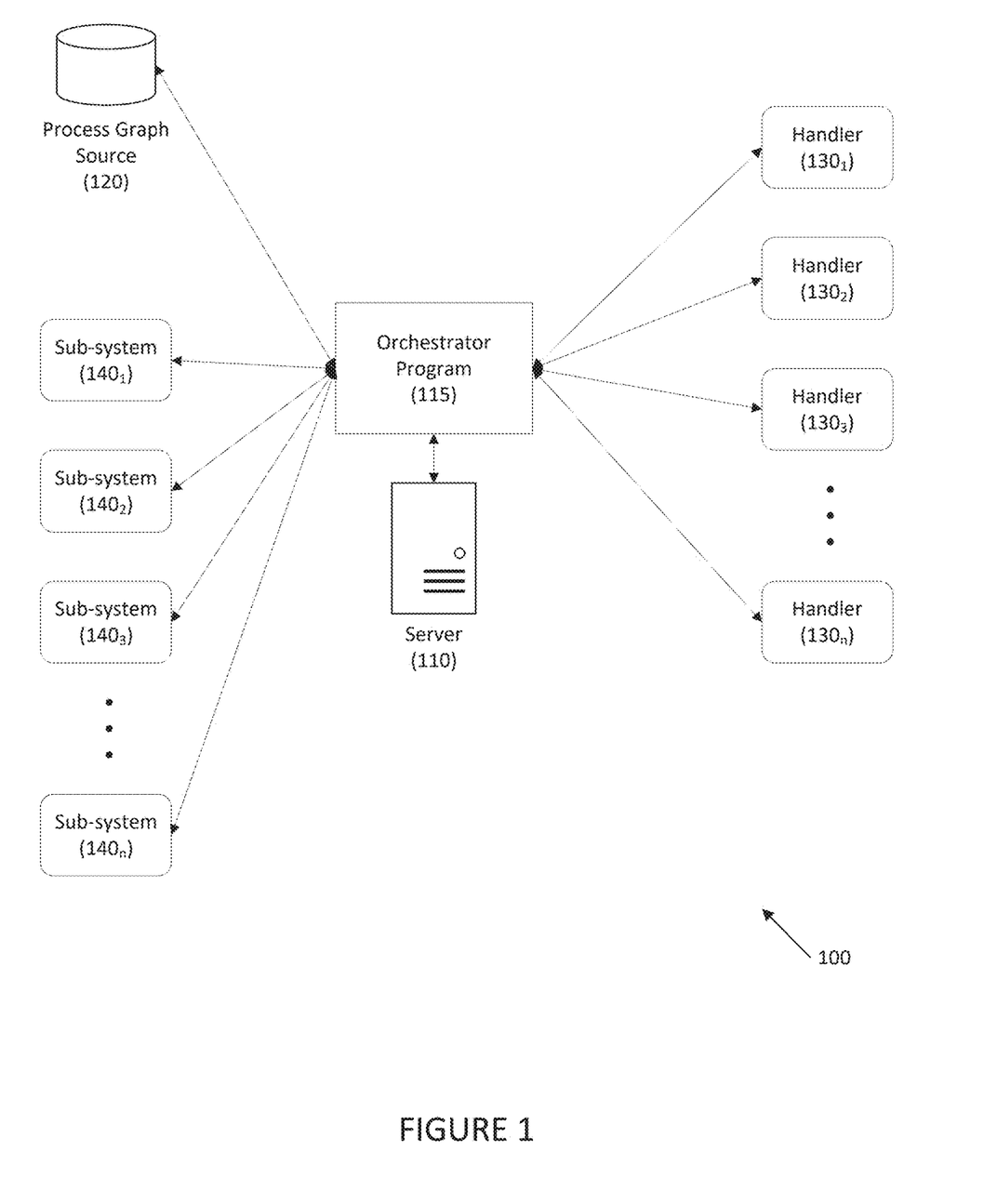
FIG. 1 depicts a system for executing a process using a graph data structure according to one embodiment.

Referring to FIG. 1, a system for providing a lightweight java workflow orchestration library using a graph data structure is disclosed according to an embodiment. System 100 may include server 110, which may be a cloud-based server, a physical server, etc. that may execute orchestrator program 115. Orchestrator program 115 may be a computer program, script, application, etc. executed on server 110 that receives a request to execute one or more process from one or more sub-systems $140_1$, $140_2$, ... $140_n$. The process may be graphically represented in a process graph from process graph source 120. For example, process graph source 120 may be a database, a system, a third party, a library, etc.

The graphical representation of a process may include a plurality of nodes and edges connecting the nodes. In one embodiment, each node may include data representing what operation to request, what input data to send with the request, and where to send the request.

In one embodiment, a graphical representation of a process may be parsed into a file, such as a JSON file. For illustrative purposes only, an example template is as follows:

```
{
  "workflow": {
    "graphType": "ACYCLIC",
    "templateName": "ORDER_MANAGEMENT_TEMPLATE",
    "nodes": [
      {
        "templateNodeId": "1",
        "operationType": "CHARGE_CUSTOMER_ORDER",
        "requestPayloadDataType": "CART_DETAILS",
        "dispatchType": "KAFKA",
        "dispatchAddress": "CUSTOMER_ORDER_TOPIC"
      },
      {
        "templateNodeId": "2",
        "operationType": "SHIP_ORDER",
        "requestPayloadDataType": "SHIPMENT_DETAILS",
        "dispatchType": "ASYNC_LOCAL_METHOD",
        "dispatchAddress":
        "com.ecommerce.example.OrderShipperClass.shipOrderMethod"
      },
      {
        "templateNodeId": "3",
        "operationType": "CANCEL_ORDER",
        "requestPayloadDataType": "ORDER_DETAILS",
        "dispatchType": "REST",
        "dispatchAddress": "https://ecommerce.com/cancel_order"
      }
    ],
    "edges": [
      {
        "type": "SUCCESS",
        "from": "1",
        "to": "2"
      },
      {
        "type": "FAILURE",
        "from": "2",
        "to": "3"
      }
    ]
  }
}
```

The operation may be represented by a value named operation type that may be recognized by any handler 130 and tells handler 130 what operation to do.

The payload type or input data type details may represent the input data for the operation. The payload type may include, for example, payment details, an order form, a customer profile depending on the domain and type of operation within the domain, etc. It should be recognized that these are exemplary only and the payload type may vary based on the use case.

The node may further include dispatch details that may provide details regarding how to send the message (e.g., to a webserver via rest, using a messaging queue, etc.) to the handler. The dispatch details may be based on the technology that is used to communicate with the appropriate handler $130_1$, $130_2$, ... $130_n$.

The dispatch details may further include dispatch details that specify where to send the message within the context of the messaging technology represented by the dispatch type (e.g., the address of the appropriate handler $130_1$, $130_2$, ... $130_n$). This may be, for example, the webserver's address for the appropriate handler $130_1$, $130_2$, ... $130_n$, the messaging queue topic/channel name for the appropriate handler $130_1$, $130_2$, ... $130_n$, etc. The dispatch address may depend on the dispatch type and the connectivity to handler 130 for the node's operation type.

In one embodiment, messaging, such as Kafka, may be used by the orchestrator to send messages to the handler identified in the node. When Kafka is the messaging technology, the node address may be a Kafka topic. Thus, when the handler receives a new message on a Kafka topic, the handler processes the message, and returns the result of the processing as a Kafka topic dedicated to workflow results.

In embodiments, each node may further be provided with conditions that indicate a path to follow based on the response from the one or more handler $130_1$, $130_2$, ... $130_n$, such as a process that is responsible for fulfilling the request represented by a node in the graph. For example, if the requested operations specified in the node is "charge credit card" with a supplied input data that represents credit card information, handler $130_1$ would take this input and charge the credit card, and then return a result indicating if this was done successfully or not to orchestrator 115.

Each handler $130_1$, $130_2$, ... $130_n$ may execute, or may be responsible for executing, a different process. For example, orchestrator 115 may receive a request from sub-system $140_1$, such as an order management system, to orchestrate customer payment for an order. Orchestrator 115 may evaluate the order (e.g., item(s), price, etc.) and may select one or more handler $130_1$, $130_2$, ... $130_n$ based on the process graph. For example, orchestrator 115 may select one of handers $130_1$, $130_2$, ... $130_n$ based the value of the order, such as offer free shipping, perform more stringent fraud checks, etc. versus low value orders (e.g., handler $130_1$ may be responsible for performing the tougher fraud check, and handler $130_2$ may be responsible for a step in the graph that charges the customer's card). Both handlers $130_1$ and $130_2$ may be separate services. If the fraud check fails, the workflow my progress down a different path where it notifies the customer that the order could not be processed, or informs the customer to call for support/verification.

In one embodiment, handler $130_1$, $130_2$, ... $130_n$ may be a micro-service, a script, etc. The location for each handler $130_1$, $130_2$, ... $130_n$ may be represented by a dispatch address in graph node's metadata, such as a rest URL for invoking a process for $130_1$, $130_2$, ... $130_n$, a method name for the process, etc.

In embodiments, handler $130_1$, $130_2$, ... $130_n$ for an operation represented by a given node, the handler for that operation may be a subcomponent of the same system that the orchestration logic is also a part of, even if they are split into smaller separate micro-services to form that subcomponent.

In embodiment, handlers $130_1$, $130_2$, ... $130_n$ may be within the same system as orchestrator 115, or handlers $130_1$, $130_2$, ... $130_n$, may be in a separate system from orchestrator 115. For instance, in the e-commerce example, a process graph may be used to model the required behavior between the order management and shipping systems, calling interfaces within each system in the right sequence needed to process a particular kind of order.

The graph and the workflow that the graph represents may be managed and executed by separate processes. Both orchestrator 115 and handlers $130_1$, $130_2$, ... $130_n$, may be part of independent processes on the same machine, or independent processes on different machines. In either case, they may represent two parts of a broader system.

In one embodiment, sub-system $140_1$, $140_2$, ... $140_n$, may be any suitable system that may request orchestration of a process from orchestrator 115. For example, sub-system $140_1$, $140_2$, ... $140_n$, may be "calling systems" that may request the execution of one or more processes defined by a process graph. Non-limiting examples sub-system $140_1$, $140_2$, ... $140_n$, may include point of sale systems, automated teller machines, e-commerce interfaces, etc.

In one embodiment, orchestrator program 115 may be embedded in one or more subsystem $140_1$, $140_2$, ... $140_n$, the code executed by one or more subsystem $140_1$, $140_2$, ... $140_n$, etc. For example, orchestrator program 115 together with one or more subsystem $140_1$, $140_2$, ... $140_n$ may make, or be treated as, a single system. Any sub-system $140_1$, $140_2$, ... $140_n$ may have its own embedded orchestrator program 115 for conducting lower-level operations.

Figure 2:
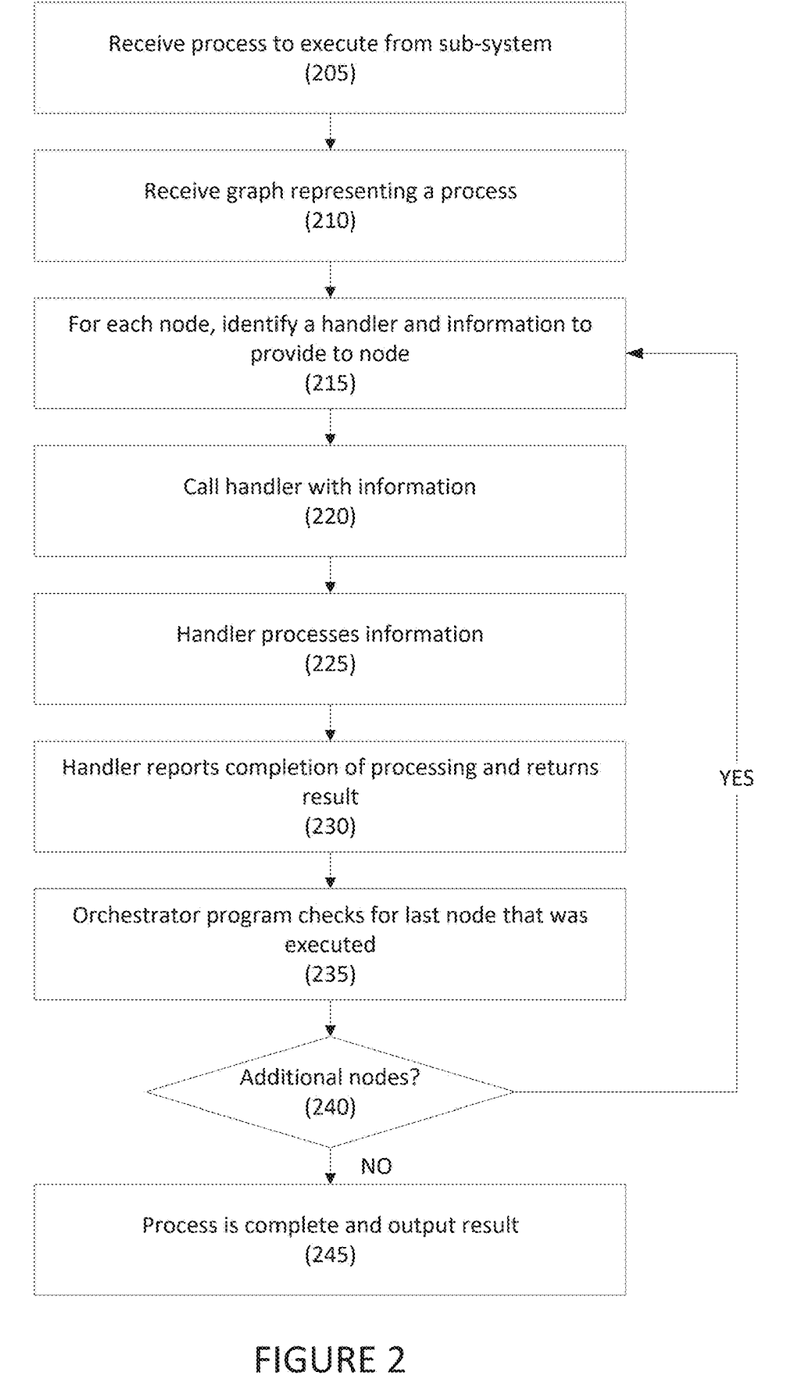
FIG. 2 depicts a method for executing a process using a graph data structure according to one embodiment.

Referring to FIG. 2, a method for executing a process using a graph data structure is disclosed according to an embodiment. In step 205, an orchestrator computer program may receive a request to execute one or more processes from a sub-system, such as a device. In one embodiment, the process may include a number of sub-processes that may be conditionally executed.

In step 210, the orchestrator computer program may identify and retrieve a process graph for the requested process from a process graph source. The graph may represent a process using nodes and edges. For example, the graph to use may be determined based on an initializing message that is received by the orchestrator computer program with details of the transaction that needs to be executed. The initializing message, which may be referred to as a strategy event, may be passed to the orchestrator computer program using any preferred middleware, such as Kafka, rest, messaging queue, etc. The strategy event may include an identifier that tells the orchestrator computer program which template to use.

In another embodiment, a trained machine learning model may select the graph based on the input data.

The orchestrator computer program may copy the graph template into a unique instance using a unique identifier so that it can keep track of the processing for specific transactions.

In one embodiment, the orchestrator computer program may not retrieve and/or load a portion of the identified process graph into memory. For example, based on parameters, such as the transaction (e.g., price, types of goods/services, parties, etc.), past experience with the user and/or similarly situated users, or any other suitable parameter, the orchestrator computer program may retrieve the portion(s) that the orchestrator computer program anticipates being traversed. In one embodiment, the orchestrator computer program may identify the portion(s) to retrieve and/or load using, for example, a trained machine learning model.

In one embodiment, retrieving and/or loading less than the entire process graph may increase efficiency, speed, etc. of the process.

In step 215, the orchestrator program may traverse the process graph. At each node, the orchestrator program may identify an operation, a payload type or input data type details, details regarding how to send the message to the handler, the handler's address, etc.

The orchestrator program may save a record of the last node it processed in the process graph, so that it can keep its place as responses come back over time.

In step 220, the orchestrator program may call the handler with the information, and in step 225, the handler may process the information. For example, the handler may execute its process on the information.

In step 230, the handler may complete processing and may respond to the orchestrator program with a completion event that indicates success or failure and/or with any results associated with the process (e.g., it may return a shipping address, etc.).

In step 235, if necessary, the orchestrator program may reload the related process graph (based on the event meta data and correlating ids), and may check the process graph for the last node in the graph that was executed.

In step 240, the orchestrator program check to see if there are additional nodes to traverse based on the result. The type of edge to traverse down (e.g., success or failure) may be based on whether the event received as a result of the previous node's processing is marked as success or failure by the downstream service that sent the event to the orchestrator. If the previous node's processing is marked as success, the orchestrator program traverses the success edge and processes the node on the other side of that. If the previous node's processing is marked as, the orchestrator program traverses the failure edge and process that node.

In another embodiment, the type of edge may be a trigger edge. For example, when the orchestrator program receives an external trigger, such as a cancellation of a payment, the orchestrator program may mark the process graph related to that event as "triggerReceived=true". In this case, when the orchestrator program receives the next response from a handler, it may determine whether a trigger edge is available from the current node. If a trigger edge is not available at the current node, the process may continue to traverse the process graph until a trigger node is available. Conceptually, this may be similar to a thread interrupt, and allows the process to diverge from the normal processing based on an external trigger.

For trigger edges, a flag may be persisted in the process graph instance read by the orchestrator program that contains an attribute indicating that a trigger was received. From there, the orchestrator program may traverse the process graph to the next possible trigger edge if the trigger flag is set. In embodiments, this may require the orchestrator program to process a few nodes normally to get to a node that has a trigger edge. An example of this is being unable to cancel a payment until the node that created the open payment is reached.

In embodiments, it may not be possible to process or handle a trigger if the orchestrator program is too far down the process graph, such as if the payment is settled and cannot be cancelled after an amendment is received. In those cases, an alert or notification may be provided. This may be represented as a trigger edge from the last node of the graph, or as a step from the associated graph when it sees the booked/settled event published by the payment it is trying to cancel and amend.

If there are additional nodes, in step 245, the process is complete and any output may be provided.

In one embodiment, the nodes selected and/or the edges traversed may be used to train the machine learning model that may be used to select the portion(s) of the process graph to retrieve and/or load.

Although multiple embodiments have been described, it should be recognized that these embodiments are not exclusive to each other, and that features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A computer-implemented method for executing a process using a process graph data structure, comprising:
   receiving, at an orchestration computer program executed by at least one computer processor, a process comprising data to execute from a sub-system;
   identifying, by the orchestration computer program, a process graph, from a plurality of process graphs stored in a process graph source, for the process to execute based on the data, the process graph comprising a plurality of nodes connected by edges, wherein each of the plurality of nodes in the process graph represents a type of operation to perform, an identification of data input for the operation, and an address for a handler to perform the operation;
   retrieving, by the orchestration computer program, the identified process graph from a process graph source, wherein retrieving the identified process graph comprises:
      identifying, by a trained machine learning model, at least one of the plurality of nodes that the trained machine learning model anticipates for traversal;
      defining a process graph portion comprising less than an entirety of the identified process graph, the identified process graph portion comprising the at least one of the plurality of nodes; and
      loading the identified process graph portion from the process graph source into a memory of the sub-system to increase an efficiency of the process;
   traversing, by the orchestration computer program, the identified process graph portion to a first node;
   calling, by the orchestration computer program, a first handler identified by the first node with the data, the data comprising at least an address of the first handler;
   receiving, by the orchestration computer program and from the first handler, a first result;
   in response to receiving the first result, determining, by the orchestration computer program, whether there are additional nodes in the identified process graph portion;
   in response to determining that the identified process graph portion includes a second node, selecting, based on the result, one of a plurality of edges from the first node to a second node;
   calling, by the orchestration computer program, a second handler identified by the second node with the first result and the data, the data comprising at least an address of the second handler;
   receiving, by the orchestration computer program and from the second handler, a second result;
   outputting, by the orchestration computer program, the second result to the sub-system;
   in response to receiving the second result, determining that the identified process graph portion does not include any more additional nodes; and
   in response to determining that the identified process graph portion does not include any more additional nodes, updating the training the machine learning model based on the traversal of the identified process graph portion.

2. The method of claim 1, wherein the sub-system comprises a terminal.

3. The method of claim 1, wherein the address comprises a webserver address for the handler.

4. The method of claim 1, wherein the address comprises a Kafka topic.

5. The method of claim 1, wherein the first result comprises a completion event.

6. The method of claim 1, further comprising:
   receiving, by the orchestration computer program, a trigger;
   traversing, by the orchestration computer program, the process graph to a node comprising a trigger edge; and
   traversing, by the orchestration computer program, the trigger edge to a third node that executes a trigger event for the trigger.

7. The method of claim 6, further comprising:
   persisting, by the orchestration computer program, a flag in response to receiving a trigger.

8. A system comprising a processor and a memory for executing a process using a process graph data structure, comprising:
   an orchestration computer program executed by at least one computer program;
   a plurality of handlers, each handler associated with one of a plurality of operations; and
   a process graph source comprising a plurality of process graphs, wherein each process graph comprises a plurality of nodes connected by edges, wherein each of the plurality of nodes in the process graph represents a type of operation to perform, an identification of data input for the operation, and an address for a handler to perform the operation;

wherein:

the orchestration computer program receives a process comprising data to execute from a sub-system;

the orchestration computer program identifies one of the plurality of process graphs, from a plurality of process graphs stored in the process graph source, for the process to execute based on the data;

the orchestration computer program retrieves the identified process graph from the process graph source, wherein the orchestration computer program retrieves the identified process graph by:

identifying, by a trained machine learning model, at least one of the plurality of nodes that the trained machine learning model anticipates for traversal;

defining, by the trained machine learning model, a process graph portion comprising less than an entirety of the identified process graph, the identified process graph portion comprising the at least one of the plurality of nodes; and loading the identified process graph portion from the process graph source into a memory of the sub-system to increase an efficiency of the process;

the orchestration computer program traverses the identified process graph portion to a first node;

the orchestration computer program calls a first handler identified by the first node with the data, the data comprising at least an address of the first handler;

the orchestration computer program receives a first result from the first handler; the orchestration computer program selects one of a plurality of edges from the first node to a second node based on the result;

in response to receiving the first result, the orchestration computer program determines whether there are additional nodes in the identified process graph portion;

in response to determining that the identified process graph portion includes a second node, the orchestration computer program calls a second handler identified by the second node with the first result and the data, the data comprising at least an address of the second handler;

the orchestration computer program receives a second result from the second handler, the orchestration computer program outputs the second result to the sub-system;

in response to receiving the second result, the orchestration computer program determines that the identified process graph portion does not include any more additional nodes; and in response to determining that the identified process graph portion does not include any more additional nodes, the orchestration computer program updates the training the machine learning model based on the traversal of the identified process graph portion.

9. The system of claim 8, wherein the sub-system comprises a terminal.

10. The system of claim 8, wherein the address comprises a webserver address for the handler.

11. The system of claim 8, wherein the address comprises a Kafka topic.

12. The system of claim 8, wherein the first result comprises a completion event.

13. The system of claim 8, wherein the orchestration computer program is further configured to:

receive a trigger;

traverse the process graph to a node comprising a trigger edge; and traverse the trigger edge to a third node that executes a trigger event for the trigger.

14. The system of claim 13, further comprising:

persisting, by the orchestration computer program, a flag in response to receiving a trigger.

15. A non-transitory computer readable medium having stored thereon software instructions that, when executed by a processor, cause the processor to perform the following:

receive a process comprising data to execute from a sub-system;

identify a process graph, from a plurality of process graphs stored in a process graph source, for the process to execute based on the data, the process graph comprising a plurality of nodes connected by edges, wherein each of the plurality of nodes in the process graph represents a type of operation to perform, an identification of data input for the operation, and an address for a handler to perform the operation;

retrieve the identified process graph from a process graph source, wherein the identified process graph is retrieved from the process graph source by:

identifying, by a trained machine learning model, at least one of the plurality of nodes that the trained machine learning model anticipates for traversal;

defining, by the trained machine learning model, a process graph portion comprising less than an entirety of the identified process graph, the identified process graph portion comprising the at least one of the plurality of nodes; and loading the identified process graph portion from the process graph source into a memory of the sub-system to increase an efficiency of the process;

traverse the identified process graph portion to a first node;

call a first handler identified by the first node with the data, the data comprising at least an address of the first handler;

receive a first result from the first handler;

in response to receiving the first result, determine whether there are additional nodes in the identified process graph portion;

in response to determining that the identified process graph portion includes a second node, select one of a plurality of edges from the first node to a second node based on the result;

call a second handler identified by the second node with the first result and the data, the data comprising at least an address of the second handler;

receive a second result from the second handler;

output the second result to the sub-system;

in response to receiving the second result, determine that the identified process graph portion does not include any more additional nodes; and in response to determining that the identified process graph portion does not include any more additional nodes, update the training the machine learning model based on the traversal of the identified process graph portion.

16. The non-transitory computer readable medium of claim 15, wherein the address comprises a webserver address for the handler.

17. The non-transitory computer readable medium of claim 15, wherein the address comprises a Kafka topic.

18. The non-transitory computer readable medium of claim 15, wherein the first result comprises a completion event.

19. The non-transitory computer readable medium of claim 15, further comprising software instructions that, when executed by a processor, cause the processor to perform the following:
   receive a trigger;
   traverse the process graph to a node comprising a trigger edge; and
   traverse the trigger edge to a third node that executes a trigger event for the trigger.

20. The non-transitory computer readable medium of claim 19, further comprising software instructions that, when executed by a processor, cause the processor to perform the following:
   persist a flag in response to receiving a trigger.

\* \* \* \* \*